April 17, 1945. G. F. HODSON 2,373,682
EGG THAWING
Filed Feb. 4, 1943 2 Sheets-Sheet 1

Inventor:
George F. Hodson,

April 17, 1945. G. F. HODSON 2,373,682
EGG THAWING
Filed Feb. 4, 1943 2 Sheets-Sheet 2
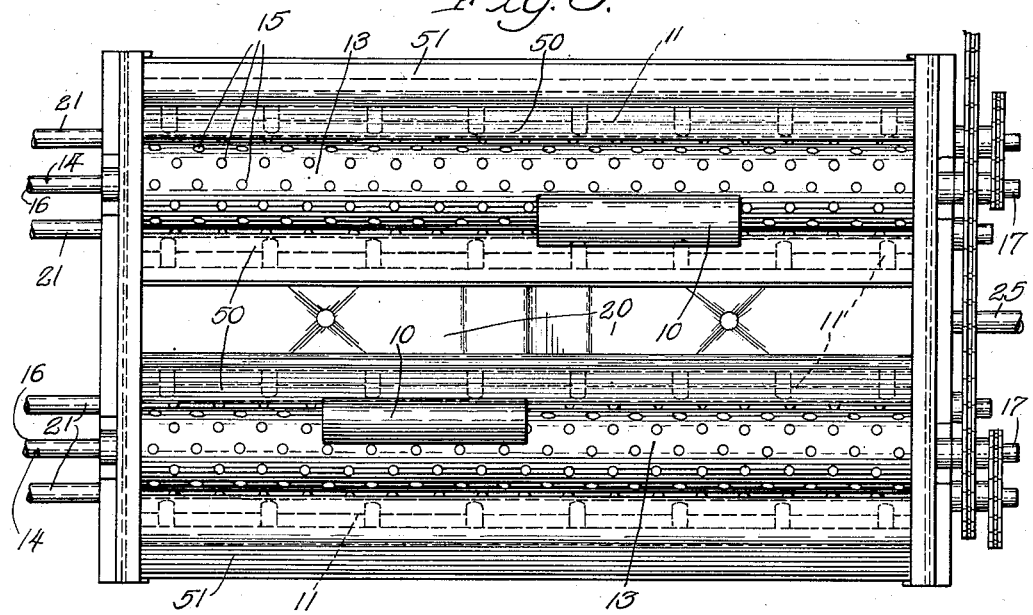
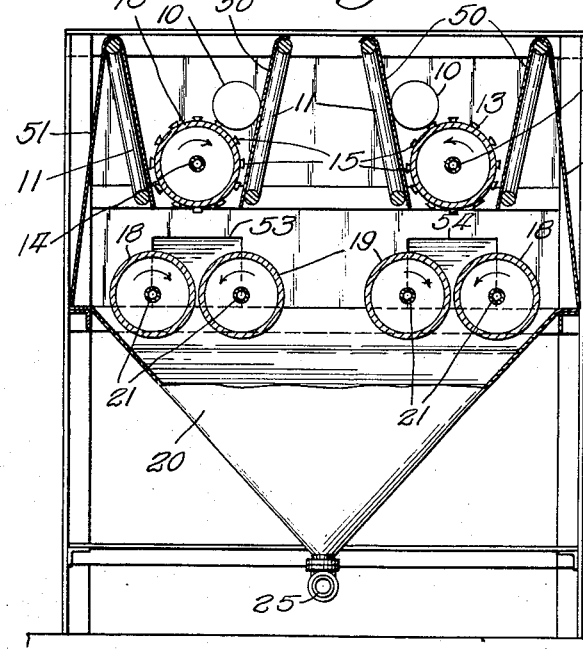
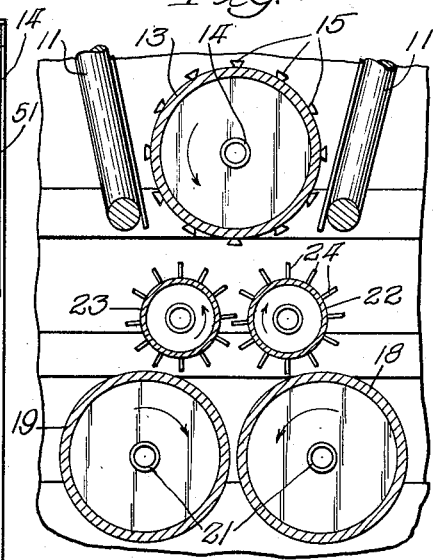
Inventor:
George F. Hodson, Patented Apr. 17, 1945

2,373,682

UNITED STATES PATENT OFFICE 2,373,682

EGG THAWING

George F. Hodson, Oklahoma City, Okla., assignor to Wilson & Company, Inc., Chicago, Ill., a corporation of Delaware Application February 4, 1943, Serial No. 474,699

4 Claims. (Cl. 99—196)

This invention relates to a method of and apparatus for thawing eggs.

It is now customary to place egg material, either whole eggs, egg yolks or egg whites, in large containers within which they are frozen solid. Generally these containers are cylindrical, being about 13" long and being circular in cross-section with a diameter of about 8". Egg material has a very poor heat conductivity and also has a very high viscosity. As a result of both of these factors, thawing of the egg material is extremely slow. This is further complicated by the fact that the egg will coagulate if heated above 135° F. or thereabouts and, therefore, cannot be subjected to higher temperatures even locally. Up to the present time no satisfactory rapid thawing device for defrosting such blocks of egg material has been developed.

I have now discovered that blocks of frozen egg material may be rapidly and effectively defrosted by placing the blocks freely upon a support, upon which they rest by the effect of gravity, and then causing the blocks to rotate upon their axes while the periphery of the block is in contact with a cutting or shredding device. In this way the blocks are surprisingly enough in effect turned down to thin ribbons and the whole operation of thawing may be completed within a few minutes.

Figure 1:
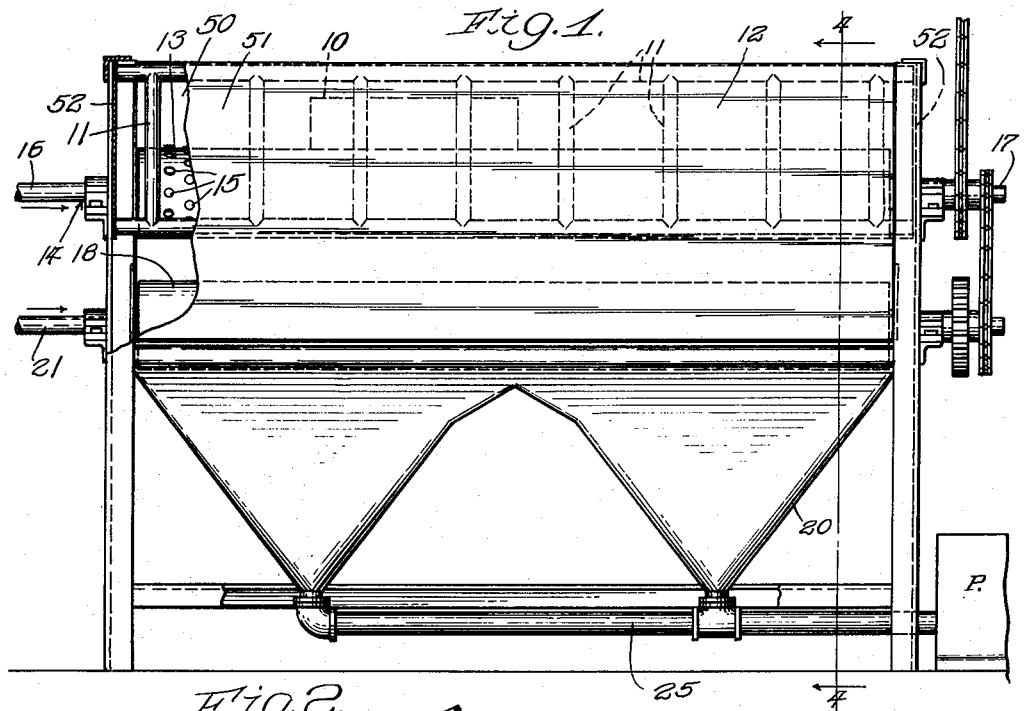
Figure 2:
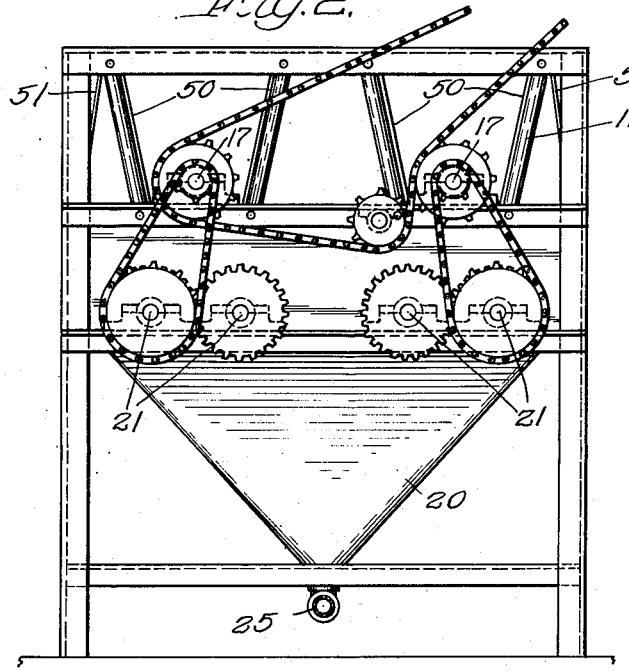
Figure 5:
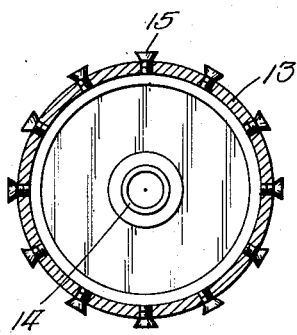

The invention is illustrated in its preferred form in the drawings, in which Figure 1 is a side elevation of an apparatus suitable for carrying out the thawing action; Figure 2 is an end view of the right hand end of the apparatus as shown in Figure 1; Figure 3 is a plan view of the structure; Figure 4 is a vertical section taken along the line 4—4 in Figure 1; Figure 5 is an enlarged sectional view of the cutting cylinder; and Figure 6 is a diagrammatic sectional elevation illustrating a modified form of the invention.

As shown in the drawings, the blocks of egg 10 are placed freely upon a support 11 which preferably comprises a plurality of spaced round bar members inclined slightly away from the vertical. A suitable plate 50 closes the spaces between the bars and additional plates 51 may be employed to close the sides of the structure. In addition an end plate 52 is employed at each end of the machine. A distance of 9" between centers of the bars has been found satisfactory, the bars themselves being about 2" in diameter and about one foot long. When placed upon this support, the egg block is pressed by gravity against the cutting cylinder 13 which is mounted upon a shaft 14. Any suitable means for rotating the cylinders may be provided. A cylinder 8" in diameter may suitably rotate at from 175 to 200 R. P. M. when operating upon egg blocks 8" in diameter. The surface of the cylinder should be roughened and this is suitably accomplished by providing the series of projecting bolts 15. Bolts having a $\frac{1}{16}$" protrusion are suitable and they may be provided in rows spaced approximately 2" apart, the rows being formed spirally upon the surface of the cylinder so as to provide a continuous cutting surface. It is important not to shear off too much egg at a time. When operating under preferred conditions the machine causes the egg material to shear off in flakes.

The cutting cylinder is preferably heated. This is accomplished by introduction of hot water of the appropriate temperature as for example through the end 16 of the shaft 14. The water may be withdrawn from the other end 17, in each case appropriate stuffing boxes being provided.

When operating the device, egg material establishes itself upon the support on its long axis, and is caused to rotate freely thereon while in gravity-pressed contact with the cutting cylinder until it is reduced to a thin rod sufficiently small to drop down into the opening between the support and the cylinder.

Beneath the cutting cylinder is a pair of heating rolls 18 and 19 which rotate in opposite directions, as indicated in Figure 4. The clearance between these rolls is only about $\frac{1}{16}$" and any large piece of frozen egg is held on the top of these rolls until it is nearly thawed, after which it is thawed or crushed between them and drops into the hopper 20. The heating rolls are about the same size as the cutting rolls but revolve at only 60 to 75 R. P. M. They are smooth surfaced but, like the cutting rolls, are heated by hot water internally supplied, as through the shaft 21. End plates 53 and 54 may be provided as shown in Figure 4 to prevent piled up egg material from escaping at the ends of the rolls.

In the drawings a dual system is illustrated and in Figure 2 is shown suitable gearing for operating the six rolls. The gearing is no part of the present invention and requires no further explanation to those skilled in the art.

Figure 6 illustrates a modification in which reject rolls 22 and 23 are provided between the cutting cylinder 13 and the heating rolls 18 and 19. These rolls rotate in the opposite direction from the heating rolls and are provided with small teeth 24 which are not large enough to carry large masses of egg material but which will catch and hold any large masses which may fall through the bars 11 until such masses are melted or have broken into small pieces which will not jam the heating rolls.

Molten egg material from the hoppers 20 may be pumped through the line 25 to a drier or to a holding vat.

The action of the thawing device is so rapid that it is possible to keep the cutting rolls at a temperature above the coagulation point of the egg. Suitably, a water temperature of 100° to 200° F. is maintained in the cutting rolls, and 100° to 200° F. in the heating rolls. The temperature determines the speed of defrosting, and it must be correlated to the speed. The preferred temperature for operation at the prescribed speeds is 135°–140° F., but at these speeds it is possible to use temperatures in the broader range stated above.

What I claim as new, and desire to secure by Letters Patent, is:

1. The method of thawing a block of frozen egg material which comprises freely rotating the block and stripping peripheral egg material from the rotating block while supplying heat to the periphery thereof.

2. The method of thawing a block of frozen egg material which comprises freely rotating the block on its long axis and stripping peripheral egg material from the rotating block while supplying heat to the periphery thereof.

3. The method as set forth in claim 2, in which the heat is supplied through the device used for stripping.

4. The method of thawing a block of frozen egg material which comprises freely rotating the block on its long axis and stripping peripheral egg material from the rotating block while supplying heat to the periphery thereof, withdrawing thawed egg material from the block, and collecting the same.

GEORGE F. HODSON.